Oct. 4, 1938.   W. H. WILMOT   2,131,778
MEANS FOR PROJECTING STEREOSCOPIC PICTURES
Filed Dec. 26, 1935   3 Sheets-Sheet 2
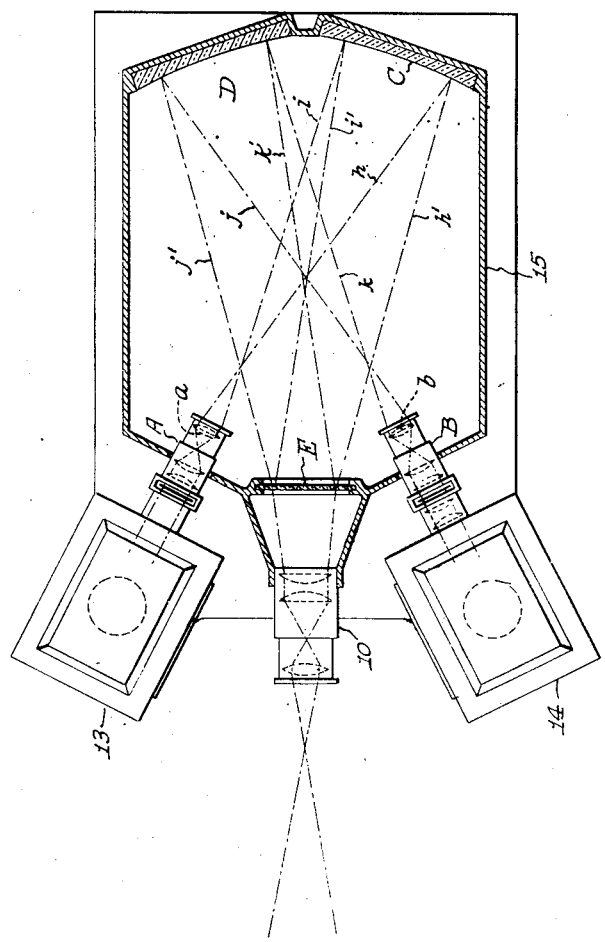
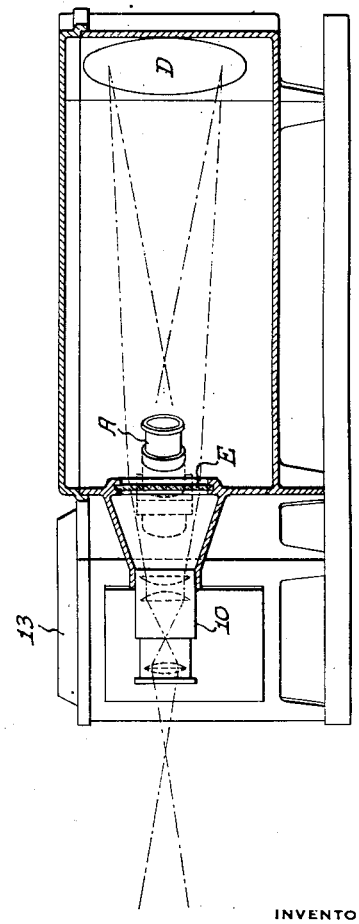
INVENTOR
William H. Wilmot,
BY
ATTORNEYS Oct. 4, 1938.   W. H. WILMOT   2,131,778
MEANS FOR PROJECTING STEREOSCOPIC PICTURES
Filed Dec. 26, 1935   3 Sheets-Sheet 3

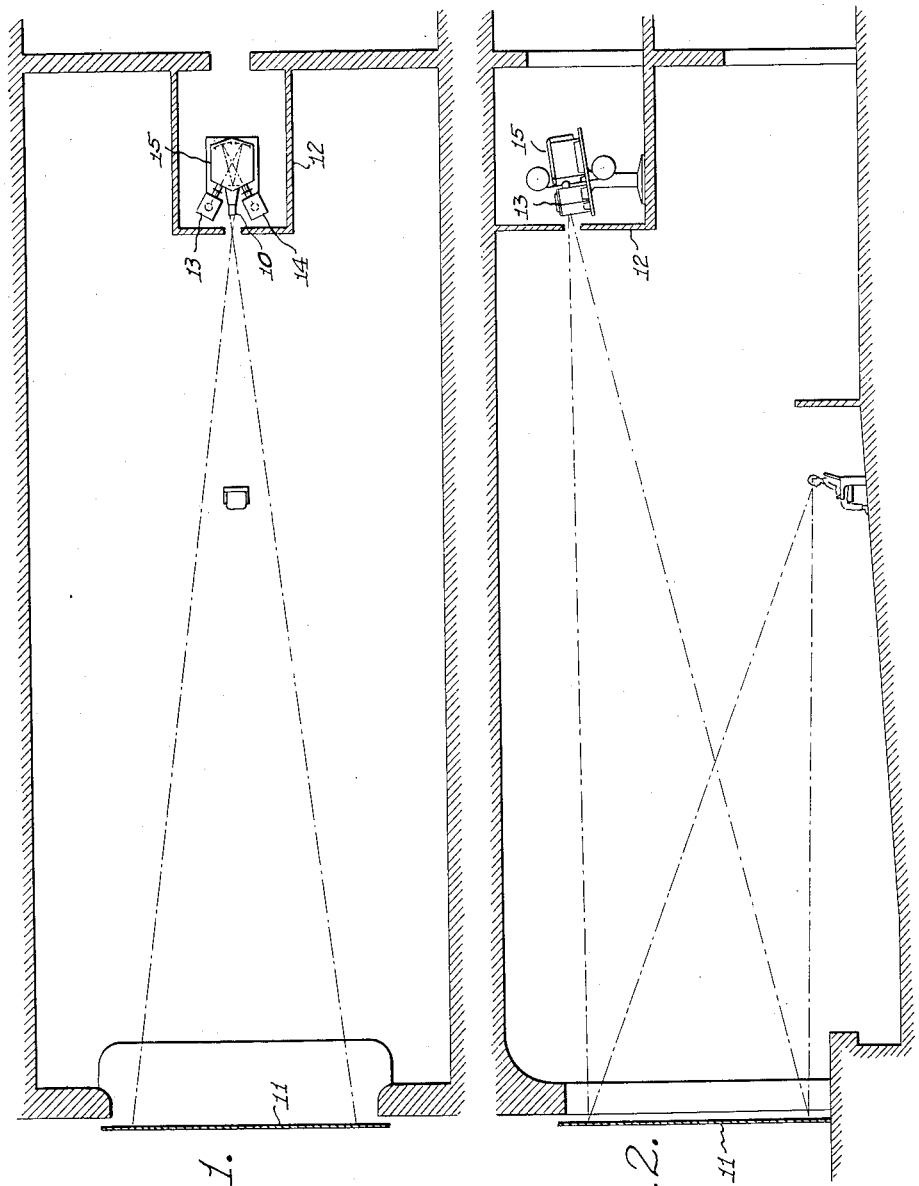

INVENTOR
William H. Wilmot,
BY
ATTORNEYS

Patented Oct. 4, 1938

2,131,778

UNITED STATES PATENT OFFICE 2,131,778

MEANS FOR PROJECTING STEREOSCOPIC PICTURES

William H. Wilmot, Asheville, N. C.

Application December 26, 1935, Serial No. 56,154

5 Claims. (Cl. 88—16.6)

This invention relates to the production of stereoscopic effects under picture projection characteristics. The invention is designed more particularly for the projection of still or moving pictures, the purpose being to present the picture—scenic or otherwise—on a vision screen with the picture having the "third dimension" or stereoscopic characteristics.

Various attempts have been made to produce effects such as are provided by the well-known stereoscope. However, there are certain difficulties present which have practically prevented even an approximate similarity in the results as compared with the true stereoscopic results produced by the stereoscope. The reason can be readily understood. In the stereoscope the two views remain individual, and the instrument is designed to maintain the eyesight as individual, so that the actual combining of the two scenes is a function of the human brain and nerve system. On the contrary, the vision screen carries but the one scene, and the audience has but the single scene within view range; if the eyes be retained as individuals by the use of a viewing apparatus—in simulation to the stereoscope—the vision screen scene is of the two-dimension type, so that the separate eyes are then receiving the same two-dimension image, rather than the individual images which are found on the two individual films of the stereoscope. To parallel the actual stereoscopic action, the vision screen would need to carry the two individual portrayals, and the instrument be arranged to focus the eyes individually on the individual views, and the large dimensions of the vision screen portrayal would render this difficult.

As a result, the simulation of stereoscopic effects has been generally confined to producing illusions of these effects—much is left to the imagination of the members of the audience. This is apparently the best that can be done under the conditions, and hence the efforts that have been and are being made to produce such effect have been along the lines of creating certain conditions such as would enable the imagination to more naturally perceive that which would appear to set up the additional third dimension to the two-dimension portrayal.

The attempts have generally been along two broad lines—one of these using but a single film, while the other utilizes a pair of films that are individual to the subject similarly to the stereoscopic film. Where the single film is employed, the illusionary effect must be produced by apparatus which will affect the normal two-dimension effect. For instance, the effect has been produced by increasing the normal contrast between light and shadow, the deeper shadow giving the impression of actual depth or an increase of depth. Other methods have been to produce double image effects by the apparatus, so that the audience, seeing both will gain the impression of perspective conditions. Special screens have been employed, as have special apparatus. The main difficulty with this type lies in the fact that the scene is taken from but a single point, and, therefore, the picture is always the same, the changes serving to provide certain types of exaggerating effects which are designed to lead the audience to itself give the desired effect to the portrayal.

The other type utilizes the dual film idea, each film being made of the same subject, but since the scene is viewed from two separate angles, they are not exactly the same. For instance, the shadows and perspective relationships are necessarily varied to a slight degree—possibly undetected by the naked eye, but present nevertheless. Consequently, the individual eyes are seeing the individual views—in the stereoscope—and these become superposed and given their proper relationship through the impulses reaching the brain. In the attempts made with this type, the apparatus is generally arranged to produce superposing of the separate scenes at some point, generally on the vision screen. The difficulty in this connection is generally found, however, through the fact that the scene is enlarged many times when appearing on the vision screen, and while the differences between the film scenes are so slight that when viewed in the stereoscope they provide the proper blending effects, the enlargements for the vision screen accentuate the differences to such an extent as to render the blending extremely difficult; in other words, the enlarging of a narrow line of the stereoscopic portrayal, is likely to be a broad line or two separate lines when enlarged for the vision screen.

The present invention is of the second type— using individual films as in the stereoscope—but the blending of the superposed scenes is provided on what may be termed a "negative" screen on which the blended view is small and itself serves as the subject to be projected upon the vision screen. Hence, the scene that is projected is itself a projected scene made up of two individual projections in superposed relationship, with the result that while the negative screen portrayal is itself seemingly two-dimension in character, it is actually a portrayal in which the effects of light and shadow, etc., are the result of ray development in place of the two-dimension film portrayal which would be present even though the negative screen scene were photographed and the resulting film then be used for projection purposes.

In addition, the apparatus employed is so arranged as to set up a more peculiar effect on the negative screen. The fore-ground of the scene which generally carries the high-light conditions and is generally found on one film or the other, is, under the present invention, produced from both films, one side being the portrayal of one of the films while the other side is the opposite side of the other film, the two being blended at the vertical axis to give the appearance of a single film. The back-ground, of seemingly less light intensity, is that of the remaining sides of the two films, with the back-ground side of one film forming the back-ground for the fore-ground side of the other film, the respective fore-ground sides being slightly deformed laterally, while the back-ground sides approach normal conditions. When superposed, the effect is of perspective characteristic, as well as a change in the light and shadow effect, so that there is a definite appearance of the third dimension characteristic. And since the negative screen portrayal is that of projected rays—and therefore carrying the "life" effect produced by such rays—the picture on the vision screen will also have this third dimension effect, although its actual source is that of the negative screen.

To illustrate the effect, one of the pairs of films used during the tests were produced from a pair of stereoscopic views of a full moon, thus presenting one of the severest tests—that of portraying that which is practically a sphere; the original was a very old stereoscope view, and the two halves of the view were used to produce the two films. Each was focused on the negative screen as an individual, and presented the normal two-dimension appearance. When the second was added to the first portrayal to set up the superposing condition, the flat face of the moon instantly took on the ball or sphere shape—the fore-ground seemingly moving toward the audience, so that the third dimension characteristic was obviously present; the movement of the fore-ground forward was more or less illusionary, since the action was that of seemingly moving the periphery rearward; this latter is evident from the tests made with other films of a different scene where the back-ground noticeably moved backward—the expected action in adding the third dimension.

The vision screen therefore carries a portrayal of the blended negative screen showing, the latter screen being of a translucent type with the image produced on one side of the screen, the projecting lens unit being located on the opposite side of such screen so that the screen itself takes on somewhat of the characteristics of the original films from which the blended or composite picture is produced, whether the latter be actually a negative or a positive film; the term "negative screen"—as used herein being intended to refer more particularly to the fact that the screen, like the film or negative in a projector, receives the light rays which serve to produce the picture. Hence, the audience views the vision screen portrayal without the necessity of using any separate viewing apparatus, and the apparatus of the present invention tends to reproduce some of the characteristics of the parallax conditions by which the third dimension effect is seen.

The apparatus used occupies comparatively small space, and is therefore capable of installation at convenient points; for instance, the apparatus may be located in the projection room of a moving picture theatre, or be located in rear of the audience vision screen, the invention thus lending itself to desired installation conditions.

The invention consists in the methods, apparatus and arrangements as more particularly described hereinafter, illustrated in the accompanying drawings, and more particularly pointed out in the appended claims.

In the accompanying drawings, in which similar reference characters indicate similar parts in each of the views,—

Figure 1 is a horizontal, sectional, diagrammatic view taken longitudinally of a movie house with the projection apparatus in its relation to the vision screen, the view locating the apparatus in the usual projection room;

Fig. 2 is a similar diagrammatic view, showing the house and projection room in vertical section;

Fig. 3 is an enlarged horizontal, sectional, diagrammatic view of the projection apparatus, the projection apparatus being shown in plan;

Fig. 4 is a central, vertical section through Fig. 3, the lens being shown in elevation.

Figure 5:
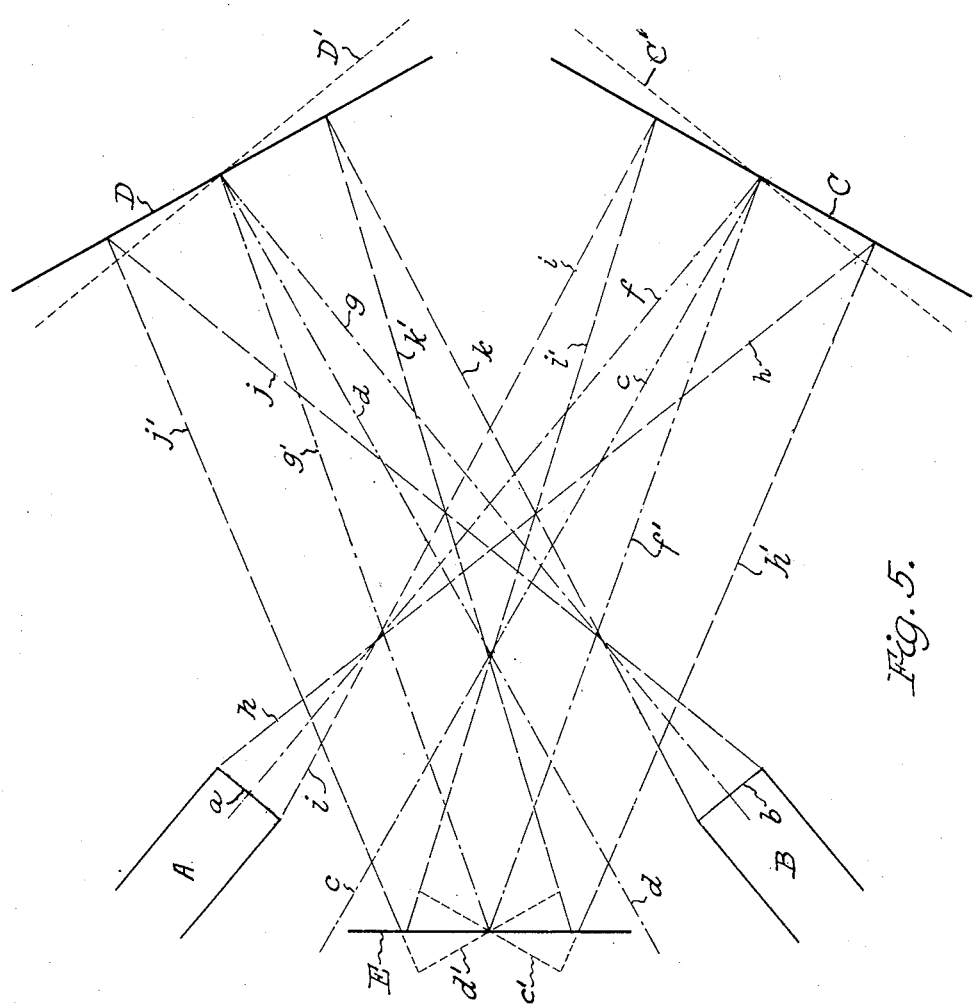
Fig. 5 is a diagrammatic view illustrating the light ray development in producing the image on a negative screen, the view utilizing plane reflecting surfaces instead of the curved surfaces actually used and as shown in Fig. 3, in order to simplify the showing.

The invention is itself the result of much experimentation and innumerable tests. Even though it has been possible to isolate some of the details which can be seen as factors of the theory of action, it is readily understood that all of the possible factors to be considered have not been definitely found and isolated. The results have been produced, but the exact reasons for their production have not been fully developed.

For instance, in the tests made with the "moon" picture referred to above, it was possible to note the factors hereinafter referred to, but the exact reasons for the finished effects that are set up, have not been exactly determined. The spherical form of the moon was perfectly apparent, and the markings which show the details of the non-uniform terrain are clearly presented, but the exact ray action that is present, has not as yet, been determined with the accuracy which would permit of an exact mathematical showing of the specific details.

Another film used in the tests was that of a stereoscopic view, termed "a Zulu baby"—a child, more or less nude, seated on the ground in the fore-ground of the picture, the back-ground being made up of a board fence, a chimney and some other effects. The stereoscopic view parts were separately filmed for the tests and these were used during these tests. When each film was projected on the negative screen as individual, both carried the two-dimension aspect that one finds in general portrayals. When, however, the two films were simultaneously projected on the screen in superposed relation, the third dimension effect was at once apparent. In fact, during the tests with this scene, a number of the characteristics were very clearly demonstrated, due to the fact that the apparatus was arranged with individual switches for each projector, thus enabling the views to be considered as individuals and the effects noted when the second film image was superposed. To indicate somewhat of these, a detail explanation is made:

The picture presented the "baby" in the center zone and had obviously been the focusing point of the scene when the original negatives were made by the twin camera used; one lateral marginal zone carried the stone chimney portion, while the opposite marginal zone carried the tail zone of a cat. Since the angles at which the respective cameras were viewing the scene, visioned these marginal portions (these being rearward of the baby in the scene) with different perspective effects, the two marginal zones differed somewhat in the two films. In the tests, it was noted that with one of the projectors presenting a single image, the addition of the second film image, left one marginal zone unchanged, but the other marginal zone definitely changed the zone to the showing of that zone on the second film; when the conditions were reversed by using the other projector as the sole image producing means, the adding of the second image then provided similar changes as before, excepting that the effect on the two margins was reversed. It was a condition that clearly indicated that half of the foreground of the composite picture was coming from one film while the other half was emanating from the other film. In each case, the composite picture presented the complete third dimension effect, but the fore-ground itself was a composite fore-ground which did not present a portrayal of either film alone, but distinguished from both films considered as individuals. In other words, the fore-ground gave somewhat of the characteristics of what would be seen by the lens of a single camera located midway between the twin cameras, but with the portrayal of the marginal zones slightly exaggerated.

The apparatus used during the tests—other than a projection lens unit of more or less standard type—were a pair of projectors, a pair of spherically-concave mirrors, and the screen heretofore referred to as the "negative" screen. The projectors were of the "home" type, each having lamps of 100 watt type, to permit a filmed image to remain stationary without destroying the film. To illustrate dimensions, the lamp was located 4½ inches in rear of the film, with a metal reflector a similar distance in rear of the lamp. A concavo-convex lens was located between the lamp and the film in such position as to center the light upon the film. The usual projection lens unit of the projector was omitted, and in place thereof, a small lens carrier was substituted, this carrying an achromatic planoconvex lens, the latter being located 4½ inches forward of the film. This lens was indexed at 9.75 for the convex face having a diameter of approximately one inch.

The spherically-concave mirrors had been especially made for the purpose, each mirror having the radius of its curvature as 112 inches. Since the distance between the lens and the mirror was relatively short, the difference in radii left the mirror curvature as materially flatter than that of the convex face of the lens.

The negative screen was formed of film material carrying a light emulsion coating on one side, sufficient only to make the screen translucent, the image being projected onto the emulsified side and the portrayal viewed from the opposite side. In the tests referred to, the image zone of the mirror was approximately three times that of the film, while the image zone on the negative screen was approximately twice that of the film image. Hence, the negative image which was used for projection upon the vision screen, had a portrayal about twice the dimensions of that of the film actually used. A vision screen was placed about five feet from the projection lens, when it was desired to note the effect on the vision screen. However, to permit of better study, the negative screen image itself was studied by the use of a magnifying glass.

The arrangement of the parts was generally as indicated in Fig. 3, this placing the projectors and their mirrors as on opposite sides of a longitudinal line, the two projectors being symmetrical to such line, and with the axis of the negative screen located on such line. The apparatus thus set up the conditions of crossed rays, the axes of the two projector lenses being spaced approximately 4½ inches, with the axis of the screen midway of this distance. Since the axes of lenses and screen were thus out of alinement, the mirrors were necessarily rotated about a vertical axis corresponding to the vertical diameter of each mirror, in order to permit proper focusing of the image upon the screen, the lens axis of a projector being alined with the focal axis of the mirror used with that projector. In the arrangement, this placed the distance between the lens and mirror as substantially 7½ inches, with the distance from mirror to the screen as 7½ inches, the dimensions indicated being at the respective axes.

Due to the lengthy radius of the mirrors, and the short distances otherwise, an exact diagramatic showing is impracticable. But in order, however, that it may be possible to understand somewhat of the action, the diagram shown in Fig. 5 is presented, wherein the mirrors and lenses are shown as planes, but the ray directions indicated thereon are presented as though the respective mirrors and lenses had the curvatures indicated, this result being produced by assuming that the image zone of the mirror is three times the dimensions of the lens, and the image zone of the negative screen is twice the dimensions of the lens, these dimensions being approximately those of the actual testing apparatus in service. The diagram is thus not completely accurate, since the effect of the curvatures cannot be accurately indicated. This figure will therefore be described in detail.

A and B represent the respective lens carriers of the projectors, with $a$ and $b$ indicating the respective lenses. C indicates the mirror for lens $a$, and D the mirror for lens $b$. E indicates the "negative" screen. The focal axis of mirror C is indicated in dotted lines at $c$, (Fig. 5) while the similar axis for mirror D is indicated in dotted lines at $d$. The latter axes are midway between the axes of the lenses and the screen to set up the proper angles of incidence and reflection of the axial ray of the lens, the latter being projected to the axis of the mirror and being reflected back to the axis of the screen. The diagram would indicate the conditions on a horizontal plane which includes the several axes, the arrangement being such that the axial rays would be located on such plane.

For the purpose of explanation, Fig. 5 also includes dotted line representations C', D', $c'$ and $d'$, the line C' representing mirror C if located parallel to lens $a$, a condition which would place both the projected and reflected axial ray on the same line; line D' similarly indicating the position of mirror D under similar circumstances.

Line $c'$ extends parallel to line C, the actual position of mirror C, and this line $c'$ represents the screen E as shifted to this position, said line being used to indicate the assumed dimensions of the screen image, and line $d'$ has a similar relation to mirror D. The projected axial ray from lens $a$ is indicated at $f$ with its reflection at $f'$, $g$ and $g'$ representing the similar ray from lens $b$.

As indicated by a comparison of lines C and C', for instance, it can be seen that this mirror has been rotated about a vertical axis from the parallel position on line C' to the angular position of line C. Since the rotation is on a vertical axis, it can be readily understood that on the vertical diametral axis of the mirror, this shift leaves the projected image on the mirror unchanged on this line, the only effect, therefore, on the vertical diameter, being the enlarging characteristic provided by lens $a$. And, similarly, the reflected rays of this vertical diameter will present the same condition with respect to screen E, so that a vertical line through the axis of screen E would present simply the reduced image found on the vertical diameter of mirror C.

However, the conditions just referred to change when we consider the horizontal diameter of the mirror. Assume, for instance, that rays $h$ and $i$ are projected from lens $a$ at equal but opposite angles, if the mirror were located in position C', these rays would present paths at equal distances laterally from path $f$, but since the direction of ray projection is not affected by the angularity of mirror as indicated by C', it can be seen that the mirror shift has lengthened the length of the projected ray $h$ and has decreased the projected length of ray $i$. But, in addition, the shift has also affected the relative distances between $f$ and the points of impingement of the two rays on mirror C as compared with these distances on the mirror in position C'. Since the swing inward of the point of impingement of the ray $i$ on the mirror C has been in the direction of lens $a$, the length of the distance between $h$ and $f$ on the mirror has not been materially affected,—it is slightly lessened—so that on this half of the mirror, the mirror image approaches the conditions found at its vertical diameter, any deformation present being small and necessarily growing less and less toward the axis of the mirror, until it disappears at the vertical diameter.

Considering ray $h$, however, the distance between $h$ and $f$ on mirror C has materially increased over that of the position of C', so that it is apparent that the portion of the image lying at the side of axis $c$ contacted by $h$, will be deformed laterally due to the increase in length of this distance, and with the deformation greatest at ray $h$ and decreasing toward axis $c$, disappearing at such axis. Hence, while the image on the corresponding side of screen E will be normal or but slightly deformed, the image at the opposite side of said axis of screen E will carry the deformation characteristic, so that the two sides of the screen image laterally of the screen axis are not normal, and this effect is augmented by the fact that the screen E, itself a plane, extends angularly to and not parallel with mirror C, so that the lateral distance of reflected ray $h$ on the screen will be a greater distance from the screen axis than is reflected ray $i$.

One other condition is present in this connection due to the shift of the mirror. As will be noted, the length of the projected ray $i$ has been shortened relative to the length of ray $f$ by this shift in the mirror, while the length of ray $h$ has increased as compared with the length of ray $f$, so that the length difference between projected rays $h$ and $i$ is the sum of the two differences between these rays and ray $f$. Consequently, the image zone on mirror C would be brightest at the left margin (ray $i$) and dimmest at the right margin (ray $h$). However, the conditions are reversed with respect to the reflected ray lengths of these projected rays—ray $i'$ is of greater length than is ray $f'$, while ray $h'$ is of less length than ray $f'$, the differences in this respect being such that although the length of projected ray $i$ is the shortest (and therefore the brightest) ray of the mirror image, the combined length of this ray ($i$—$i'$) is greater than the combined length of ray $h$—$h'$, so that the conditions as to brightness of the image on the screen are the reverse of those on the mirror when lens $a$ is active alone, viz: the image on the screen will be brightest at the right ($h'$) margin and dimmest at the left ($i'$) margin, with the axis zone of an intermediate brightness. In other words ray intensity on the screen varies practically progressively in decreasing direction from $h'$ to $i'$, with the greatest intensity at the right and, therefore, placing the left marginal zone of the film covered by lens $a$ as presenting the brightest portion of the image on screen E, when lens $a$ alone is active.

But as above pointed out, ray $h$—$h'$ is also found as presenting the outer ray of the half of the mirror image zone which presents the greater deformation characteristic, the deformation being of increasing type. Hence, ray $h$—$h'$ represents not only the brightest ray from lens $a$ but it also represents the ray of greatest deformation location on the screen, while ray $i$—$i'$ represents the maximum deformation of the opposite half of the image, this being slightly in the decreasing direction, and therefore approximately normal; but this ray is also the ray of least intensity. Hence, with lens $a$ active alone, the image on the screen E will present the left half as approximately normal—laterally—while the right half will have the deformation status referred to. And since the ray intensity is greatest at the right and decreases toward the left, it can be understood that the deformed half is of greater intensity.

While the deformation is of increasing type from the axis toward the margin, the progression is not at a uniform rate but is at an increasing rate away from the mirror axis. Consequently, in the central vertical zone the deformation is slight, but it is sufficient in the composite picture to produce the third dimension effect within this zone. And since the latter zone generally is the focusing point used in taking the scene by the twin camera, the deformation action required to set up the third dimension effect in this zone is and must be extremely slight.

$j$ and $k$ represent projected rays from lens $b$ corresponding respectively to rays $h$ and $i$ of lens $a$, $j'$ and $k'$ representing the respective reflected rays. Since the apparatus is symmetrically arranged about a longitudinal axis of the apparatus, it can be understood that the ray length conditions are similar to those described above, with ray $j$—$j'$ of shortest combined length, and similar to the length of ray $h$—$h'$. However, since the mirrors extend in reverse angularity with respect to the longitudinal axis, it will be readily understood that when lens $b$ alone is active, the image on screen E will present the left half as of the deformed characteristic with the right half of the approximately normal portrayal, as to deformation, while the ray intensity will be greatest at the left of the screen image, decreasing progressively toward the right, being least at the right margin.

Hence, when both lenses become active, the conditions set up are such that the composite image on the screen E will present ray $j$—$j'$ as presenting the left marginal ray, while hay $h$—$h'$ presents the right marginal ray, these two rays being the rays of greatest deformed position of the respective films. With both of these rays also presenting the shortest ray length, these rays will also present the greatest light intensity characteristic. On the other hand, rays $i$—$i'$ and $k$—$k'$, being the marginal rays of the approximate normal half, and being spaced a lesser distance from the screen axis than rays $h$—$h'$ and $j$—$j'$, will lie inside of the latter rays on the screen, thus setting up the conditions of non-registration of the rays from the same zone of the scene, with the greatest variation at the respective margins. And since rays $i$—$i'$ and $k$—$k'$ are of least intensity, it can be understood that in the screen portrayal the greater intensity of rays $h$—$h'$ and $j$—$j'$ will dominate rays $i$—$i'$ and $k$—$k'$, the contrast in intensity between the sets of rays being greatest at the margins, the contrast decreasing in the direction of the vertical axis and disappearing on such axis.

As a result, the foreground of the image will be made up of the halves of greatest light intensity of the separate films—these also being the halves of greater deformation—while the background of the image will be made up of the other halves of less light ray intensity and approximately normal as to deformation, the deformation variation being small, the latter thus being out of registration with the foreground from the vertical axis laterally, but with the variation at an increasing rate toward the margin. While non-registration is present, its value is such as to be ineffective to disturb the appearance. Actually, it sets up the blending action that is essential to add the third dimension characteristic to all parts of the picture.

Hence, the composite image on the vision screen will present a foreground in which one half will present the scene as visioned by one of the cameras—the left half of the film of lens $a$, for instance, showing the right half of the foreground on the negative screen E—while the other half of the foreground of the picture will be presented by the scene as viewed by the other camera. Hence, neither half will present the scene as viewed from a neutral point mid-way between the cameras, the foreground itself presenting a slight change from such view, the effect being somewhat as though the opposite margins had been moved slightly forward thus tending to increase the lateral width of the scene if viewed from the neutral point.

On the other hand, the background, made up of the remaining halves of the films, and which present the lesser deformation, are also halves which appear as more remote to the respective cameras in taking the scenes, and these halves thus add their difference in shadings, etc., to the foreground halves, the effect being the tendency to set up a perspective characteristic.

For instance, in the central zone of the "baby" picture, and which presents the seated baby, the non-registration is so slight that the effect is to definitely portray the roundness of the limbs, provide the proper shadow effects which show the facial characteristics, etc. Obviously, on the exact vertical axis registration is complete. In addition, the fact that while the light intensity of the views individually varies from one margin to the other in a decreasing progression, the fact that the progression is opposite in the two views, has the effect of giving the foreground an appearance of equal light intensity throughout the lateral width of the picture, the shadows being blended in such manner as to give the appearance that is found in the best of stereoscope portrayals.

The conditions thus far discussed are those to be found on the horizontal diameter of the mirrors. Since the swinging of the mirror on its vertical axis has the effect of swinging it bodily on such axis, it is evident that any point on the vertical diameter of the mirror can be considered as dividing a horizontal line through the point, similar to the divisions of lines C or D by the focal axis of the mirror, so that the condition of deformation is determined by lateral conditions rather than radial. Consequently the deformation characteristics on each side of the vertical diameter are of a similar character. In other words, the inner half of the mirror will have the minimum deformation characteristics while the outer half will have the deformation at the maximum, the vertical diameter of the mirror dividing the two and having no deformation. Consequently, the mirror, in this position, presents asymmetrical deformation characteristics, and since these characteristics are reversed in the two mirrors, the concurrent activity of both projectors placing these two asymmetrically-deformed images in superposed relation, with the deformation effects of one image the reverse of those of the other. And, obviously, the variation in intensity effects previously described are also present in connection with each of the image portrayals.

And, in the production of the desired result, the variation in intensity referred to presents an important factor. As previously indicated, the intensity decreases from one lateral side of the image to the other, with the half of greatest intensity found as the side of minimum deformation. Hence, the foreground is made up of the halves of greatest intensity, with the background of lesser intensity, and with the variation between the two superposed images greatest at the lateral side which is also the point of greatest deformation of the foreground. This variation in intensity, however, does not affect materially the screen portrayal of the superposed images. This can be understood from the fact that at the vertical diameter, the intensity is made up of equal intensities from both lenses and is thus a combined intensity. In passing laterally from the vertical diameter, the intensity of the foreground increases, but the background decreases, so that the combined intensity is not materially varied. Consequently, the superposed image portrayals do not present the intensity variation effect found with individual portrayals, but is a combination of the two which tends to render the whole as of generally similar intensity.

One other factor may be considered and is brought about by the films themselves. Obviously, if there is a practical registration of two zones of the two films, with each zone having both light and shadow effects, the light effect is intensified by the combined intensification, while the shadows are less affected—if the shadow is deep, there would be no material change in intensity. Hence, the contrast between light and shadow will appear to be greater, thus adding to the depth effect that is desired.

And the latter condition as to the variation in light and shadow effect is further enhanced by the conditions present when taking the views initially. While a comparison of the two views will present no seemingly materially different effects, actually such effects are present although minute in character. This is due to the fact that although the focus is on the same point, the different angles of the lenses of the dual camera used, will "see" the same scene in presence of the fact that the lighting conditions remain constant. Hence, a shadow of one film will differ slightly from the other—it may be less or greater, either in area or intensity, and be more or less microscopical, but it is still present. Hence, in the portrayal on the screen, the two will be combined to produce a composite effect. On unregistering parts of the shadow, for instance, the value of the intensity contrast will tend to change as compared to the registering portions, so that a blending effect is set up such as to add to the depth effect.

As indicated in Fig. 5, the mirrors and lenses are shown as of plane character, and hence the showing is therefore more or less exaggerated. With the curved surfaces actually used and as shown in Fig. 3, the exaggerations are practically eliminated. For instance, the large deformation of the background that is indicated in this view, is materially reduced, since the curvature of the mirrors will place the focal point differently, the true cone effect of the rays being present. And this is also affected by the fact that the radius of the lens curvature is relatively small as compared to that of the mirrors, so that the ray-length conditions would be slightly affected. However, the general characteristics are made sufficiently clear by this diagram.

And these fundamental characteristics can be readily understood. They involve the superposing of the two images on the negative screen, with each image of asymmetric deformation characteristic, with the portion of maximum deformation forming the foreground of the screen portrayal and the portion of minimum deformation providing the background; the foreground is a composite made up from both films—as is the background; the light and shadow contrast is intensified, not by intensifying the shadow (essential in two-dimension portrayal) but by intensifying the light; providing the greatest contrast between the superposed portrayals at the lateral edges of the portrayal, it being understood that the conditions in the vertical direction are based on the normal action no special deformation conditions being present in this direction, the special deformation effects being laterally in the horizontal direction and bi-lateral in type; the apparatus positions are symmetrical, but the angularity of the mirrors sets up the asymmetrical deformation characteristic to the image zone of the mirrors; the angularity of the negative screen—similar with respect to both projecting units, provides not only a plane surface portrayal, but additionally serves to properly blend the individual images.

It is this composite image that is then projected on to the audience vision screen through the usual or any preferred projection lens unit. Since the negative screen image presents the three-dimension effect with its intensified contrast of lights and shadows (not possible with the normal film projection) the audience views the completed portrayal with these effects present. And while the negative screen is thus serving as a substitute for the ordinary film, the effects set up cannot be reproduced by a film alone. For instance, if the negative screen portrayal be photographed, and the attempt made to use the film in the usual projector with a view to obtaining the result, the portrayal on the audience screen will not produce the third dimension effect that is desired; the portrayal would differ from that produced by either of the films used in the present case, but it would not present the effect set up when the portrayal of the negative screen is used as the film. The exact reason for this is not understood, but it is probably due to the fact that with the usual film dependence must be placed on the light and shadow effect that is present, and this effect is provided by deepening the shadows, whereas, with the present invention the contrast is provided primarily by increasing the light intensity, and that cannot be done with the usual film.

One characteristic was noted during the various tests. If the negative screen is viewed from the side on which it receives the reflected rays, the third dimension effect appears to be greatly reduced if not lost, although it is present when the screen is viewed from the opposite side. The reason for this is not clearly understood. It is possible that in the first instance the individual portrayals appear more as individuals, so that the variation in intensity characteristic would appear more dominant, as would the deformation characteristics, so that the composite effect is lost. When, however, the screen is viewed from the opposite side, the blending of the individual portrayals is complete and it is the completed portrayal that is being used. This particular characteristic can indicate why it would not be possible to provide the result by eliminating the negative screen and projecting the individual portrayals by reflection direct from the mirrors; in such case the individual portrayals would be superposed on the audience screen, but the composite portrayal would not present the desired conditions, due to the characteristic referred to.

While the apparatus used in the experiments and tests was not of the standard theatrical dimensions, so far as the projector itself is concerned, the films employed were of the dimensions used in the standard projectors, so that the general arrangement, and possibly some of the distances that have been referred to can be considered as being of actual service requirements. Since the image on the negative screen is retained small as compared with the portrayal on the audience vision screen, it is evident that the distance between lens $a$ and its mirror C can be retained within reasonable dimensions. For instance, in the experimental set-up the length of the projected axial ray was substantially 7½ inches, with the length of its reflected ray shown as 7½ inches. These distances however are approximate, and depend upon the focusing action. For instance, tests were made in which the mirror was moved farther from the lens as well as others in which it was brought nearer; in both cases the focus was so disturbed that the image on the negative screen was blurred, etc., indicating lack of proper focusing. The angle of the mirrors was changed in various ways, but the best results were found when the apparatus was arranged approximately as indicated in the drawings. Possibly changes in the curvature of the lens and mirror could affect the distance factor in order to produce the proper focusing action, and the distance and position of the screen E could be varied, but the changes made must necessarily consider the fact that the various rays from the lens must be properly focused on the screen E, and this fact tends to limit the variations possible. In the testing apparatus the best results were shown when the difference in projected lengths of rays $h$ and $i$, for instance, was approximately ½ inch, this being variable within a reasonable range.

In the drawings, 10 indicates the projection lens unit which projects the image of screen E on to the audience vision screen, the latter being indicated at 11. No special disclosure of these is given, since they are generally standard. Nor is there any disclosure of mechanism for moving the films of the projectors in exact step relation; there are various developments on the market for producing this result, and these can be used for the purpose, where the portrayal is of the moving picture type, and it is not necessary to present these in detail.

The specific mountings of the mirrors C, D and screen E are not disclosed, since these can be of various forms to suit the individual taste. In the experimental apparatus they were mounted on movable supports to permit shifting in positions to make various tests.

In referring to "foreground" and "background" herein, these terms are being employed somewhat differently than usually employed, so far as detailed meaning is concerned. Generally, the terms are assumed to present the conditions relative to the completed portrayal where the objects closest to the audience are considered as the foreground while those appearing as in rear are considered as the background. That meaning would not apply directly to the present case, since each of the films used would present the complete scene in the two-dimension form and hence, each half of the negative screen image would present the corresponding halves of the films as a part of the brighter portion of the image. In the present case, therefore, the terms are intended more particularly to indicate the relationship between the normal two-dimension plane of the picture (this being considered as the foreground) while that which adds the third dimension is considered as the background, since this presents that which would be found in rear of the two-dimension plane. In the present disclosure, considering each of the halves separately, the brighter image coming from the half of one film, would be of the "foreground" while the other half of the other film—the dimmer and deformed half—forms the "background" for such "foreground", since it is such dimmer and deformed half which adds the third dimension effect to the portrayal of the half of the composite image.

In Figs. 1 and 2, the interior of a theatre or movie house is illustrated diagrammatically with the present apparatus illustrated as in operative position therein, the audience vision screen 11 being the curtain screen usually employed for the purpose upon the theatre stage, and 12 indicates the projection booth positioned at the opposite end of the auditorium in the usual or any other convenient location and containing the projection apparatus illustrative of an embodiment of the present invention and means for carrying out the present method of projection.

The projection apparatus comprises a pair of projector units 13, 14 of any well known construction set in angular relation to each other to project the film images at the proper angle onto the mirrors C, D located within the opposite end of a suitable enclosure 15 to exclude exterior light, the lens carriers A, B of said units projecting through the end wall of said enclosure at the end opposite said mirrors, and mounted within an opening in said end wall between the carriers A, B, is the "negative" screen E, all as more fully illustrated in Figs. 3 and 4.

While I have herein disclosed a preferred embodiment of the invention, it will be readily understood that changes and modifications therein may be found desirable or essential in meeting the various exigencies of use or the preference of the user, and I therefore desire to reserve the right to make any and all such changes or modifications therein as may be found essential or desirable insofar as the same may fall within the spirit and scope of the invention as expressed in the accompanying claims when broadly construed.

Having thus described my invention what is claimed as new is:

1. In apparatus for projecting a pair of stereoscopic image portrayals to produce a composite screen portrayal, a translucent screen, and means for projecting the image portrayals of a pair of such portrayals individually on to the screen by deflected rays, with the rays of the image portrayal of each member of the pair active to produce an asymmetric deformation of its image portrayal on the screen, and with the deformation characteristic minimum on a vertical line extending through the axis of the image portrayal and maximum at one of the lateral sides of the portrayal, said means being operative to project the second of the pair portrayals with its line of minimum deformation upon and in registration with the similar line of the first portrayal and with the maximum deformation reversed as to the lateral side of the portrayal, whereby the screen portrayal will present each of its lateral sides with a composite portrayal formed from both members of the pair and with the respective portrayals of a side differing in deformation values to produce a blending of the individual portrayals into the composite portrayal with stereoscopic effect, said means being such as to project each of the individual image portrayals with variations in light ray intensity varying from maximum at one lateral side to minimum at the opposite lateral side and with the direction of variation opposite in the pair of portrayals, whereby the composite portrayal will be of foreground and background characteristic with the foreground presenting a lateral side from one source of the pair and the opposite lateral side from the other source of the pair, said means including a pair of projectors, and a concave reflecting surface for and individual to each projector, each projector having a focal axis in registration with its reflecting surface axis and serving to project the image portrayal of one of the stereoscopic pair on to the translucent screen with the axis of the image portrayal in registration with the screen axis to thereby provide a superimposed relation of the separate portrayals of the stereoscopic pair, a projector and its reflecting surface being positioned on opposite sides of a line perpendicular to the surface of the screen and extending through the screen axis, the angularity being such as to cause the focal axis of one projector to cross said line at a point remote from the screen and at a selected angle equal to but opposite to that of the other projector, a projector and its reflecting surface having selected non-alined focal axes active to cause registration of the reflection of an axial ray of the projector on to the screen axis.

2. In apparatus for projecting the image portrayals of a stereoscopic pair to produce a composite screen portrayal of the pair with stereoscopic effect, a planar translucent screen, a pair of projectors, and concave ray-deflecting means for and individual to each projector and positioned to deflect the projected rays of a projector upon the screen, the projectors and means being relatively positioned with respect to the screen to cause the screen portrayal of an image from a projector and its ray deflecting means to present an asymmetrical deformation of the portrayed image with the deformation value minimum on a vertical line extending through the axis of the image portrayal and maximum at one of the lateral sides of the portrayal, the portrayal from one projector presenting the maximum deformation value at the lateral side opposite to that of the portrayal from the second projector, whereby with both projectors active to present the individual portrayals with the respective lines of minimum deformation value in registration the composite portrayal of either lateral side will present portrayals differing in deformation values to produce a blending of the individual portrayals into the composite portrayal with stereoscopic effect, a projector and its ray-deflecting means being positioned on opposite sides of a line perpendicular to the surface of the screen and extending through the screen axis, the angularity being such as to cause the focal axis of one projector to cross said line at a point remote from the screen and at a selected angle equal to but opposite to that of the other projector, a projector and its ray-deflecting means having selected non-alined focal axes active to cause registration of the reflection of an axial light ray of the projector on to the screen axis.

3. Apparatus as in claim 2 characterized in that the respective ray-deflecting means is in the form of a concave reflecting surface having the length of its focal axis materially superior to the length of the focal axis of the projecting lens of the projector with which it co-operates.

4. A projecting apparatus for producing pictures exhibiting relief effects comprising in combination, means for projecting a right eye picture, a concave reflecting surface for receiving the image, a planar translucent screen for receiving the image from the reflecting surface, said screen being at a selected angle to the axis of the reflected image, means for projecting a left eye image complemental to the right eye image, a concave reflecting surface similar to the aforementioned reflecting surface for receiving the left eye projected image and directing the image onto the screen with the central line of the left eye image substantially in register with the central element of the right eye picture, the axis of the second reflecting surface being at a like but oppositely-directed angle to the screen.

5. In combination, a planar translucent screen, a concave reflecting surface facing the screen, said surface having its axis inclined to the screen at a selected angle, a second concave reflecting surface facing the screen, said second surface having its axis inclined to the screen at a like but oppositely inclined angle, means for projecting a right eye picture on to the first reflecting surface to form an image on the screen, and means for projecting a complemental left eye picture on to the second reflecting surface for forming a left eye image on the screen with the reflected images in register on the central line of the images.

WILLIAM H. WILMOT.